United States Patent
Lin

Patent No.: US 6,496,778 B1
Date of Patent: Dec. 17, 2002

(54) REAL-TIME INTEGRATED VEHICLE POSITIONING METHOD AND SYSTEM WITH DIFFERENTIAL GPS

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 39 days.

(21) Appl. No.: 09/661,587

(22) Filed: Sep. 14, 2000

(51) Int. Cl.⁷ .................................................. G01S 5/02
(52) U.S. Cl. ...................... 701/215; 701/214; 701/220; 701/221; 342/357.04; 342/357.05; 342/357.14
(58) Field of Search ................................ 701/214, 215, 701/216, 221, 220; 342/357.03, 357.04, 357.05, 357.06, 357.14

(56) References Cited

U.S. PATENT DOCUMENTS

| | | | |
|---|---|---|---|
| 5,654,890 A | * 8/1997 | Nicosia et al. | 342/118 |
| 5,657,025 A | * 8/1997 | Ebner et al. | 342/442 |
| 5,740,048 A | * 4/1998 | Abel et al. | 701/200 |
| 5,757,316 A | * 5/1998 | Buchler | 342/357.11 |
| 6,166,683 A | * 12/2000 | Hwang | 342/357.04 |
| 6,175,806 B1 | * 1/2001 | Thuente | 701/213 |
| 6,181,274 B1 | * 1/2001 | Pratt et al. | 342/357.04 |

* cited by examiner

Primary Examiner—Michael J. Zanelli
Assistant Examiner—Eric Gibson
(74) Attorney, Agent, or Firm—Raymond Y. Chan; David and Raymond Patent Group

(57) ABSTRACT

A real-time integrated vehicle positioning method and system with differential GPS can substantially solve the problems encountered in either the global positioning system-only or the inertial navigation system-only, such as loss of global positioning satellite signal, sensitivity to jamming and spoofing, and an inertial solution's drift over time. In the present invention, the velocity and acceleration from an inertial navigation processor of the integrated GPS/INS system are used to aid the code and carrier phase tracking of the global positioning system satellite signals, so as to enhance the performance of the global positioning and inertial integration system, even in heavy jamming and high dynamic environments. To improve the accuracy of the integrated GPS/INS navigation system, phase measurements are used and the idea of the differential GPS is employed. However, integer ambiguities have to be resolved for high accuracy positioning. Therefore, in the present invention a new on-the-fly ambiguity resolution technique is disclosed to resolve double difference integer ambiguities. The real-time fully-coupled GPS/IMU vehicle positioning system includes an IMU (inertial measurement unit), a GPS processor, and a data link which are connected to a central navigation processor to produce a navigation solution that is output to an I/O (input/output) interface.

37 Claims, 8 Drawing Sheets

REAL-TIME INTEGRATED VEHICLE POSITIONING METHOD AND SYSTEM WITH DIFFERENTIAL GPS

FIELD OF THE PRESENT INVENTION

The present invention relates generally to a global positioning system and inertial measurement unit (GPS/IMU) integrated positioning and navigation method and system, and more particularly to a real-time fully-coupled integration method and system of the global positioning system (GPS) receiver and the inertial measurement unit (IMU), which allows the mutual aiding operation of the GPS receiver and the inertial navigation system (INS) at an advanced level with features of inertial aiding global positioning system satellite signal tracking, and on-the-fly resolution of GPS carrier phase integer ambiguities and real-time positioning in the differential GPS mode.

BACKGROUND OF THE PRESENT INVENTION

The GPS equipment, which comprises an antenna, a signal processing unit, associated electronics, and displays, receives the signals from the GPS satellites to obtain position, velocity, and time solutions. There are two types of GPS observable: code pseudoranges and carrier phases. Phase measurement is based on two L-band carrier frequencies. One is the L1 carrier with frequency 1575.42 MHz and the other is the L2 carrier with frequency 1227.60 MHz. For pseudorange measurement, there are two basic types of Pseudo Random Noise (PRN) code measurement. One is known as the C/A (Coarse/Acquisition) code modulated on the L1 frequency only and the other is known as the P (Precise) code modulated on both L1 and L2 frequencies. In addition to the above information in the GPS signals, the GPS signals also modulate the navigation message, which includes GPS time, clock corrections, broadcast ephemerides, and system status, on both L1 and L2 frequencies.

Because of the navigation message transmitted by the GPS satellites, the positions and velocities of the GPS satellites can be computed. Therefore, the propagating time of a GPS signal can be determined. Since the signal travels at the speed of light, the user can calculate the geometrical range to the satellite. In this way, the code pseudorange measurements can be determined and is degraded by errors, such as ephemeris errors, user and satellite clock biases (including selective availability (SA)), atmospheric effects (ionosphere and troposphere), and measurement noise (receiver error and random noise). These errors not only affect pseudorange measurement but phase measurement. The most obvious difference between both measurements is the measurement error. For phase measurement, the measurement noise is of the order of a few millimeters and for pseudorange measurement that is accurate to about 30 centimeters (for the P code) or 3 meters (for the C/A code).

In addition to the unavoidable errors (such as ionospheric delay, tropospheric delay, clock biases, and measurement errors) and the intentional error (such as SA). the GPS measurements (pseudorange and phase) may also be affected by the environment surrounding a GPS user antenna. Like the multipath effect, because of an object nearby the user antenna, the antenna receives not only a direct signal from a GPS satellite but also a second or more reflected or diffracted signals from the object. For a highly dynamic vehicle, the onboard GPS receiver may lose the lock of a GPS signal because the signal-to-noise ratio (SNR) is low or the GPS signal is blocked by the body of its own vehicle.

Typically, the navigation solution is estimated by using the pseudorange measurements. Since the satellite clock biases are provided by the navigation message. for three-dimensional position determination, in addition to the three unknowns in position, the receiver (user) clock bias also needs to be estimated. i.e. there are four unknowns for the navigation solution. As a result, for a stand-alone receiver, the position determination usually needs a minimum of four visible GPS satellites, and the estimated position is accurate to about 100 meters with SA on. In order to improve the accuracy of the estimated position, the phase measurements will be used. Also, to eliminate the most of SA and other common errors (for example, receiver and satellite clock biases), the differential GPS will be employed. As a result, the accuracy of the estimated position is of the order of a few centimeters. However, to achieve the centimeter accuracy, one of key steps is to resolve carrier phase integer ambiguities.

An inertial navigation system (INS) comprises an onboard inertial measurement unit (IMU), a processor, and embedded navigation software(s), where the components of the IMU include the inertial sensors (accelerometers and gyros) and the associated hardware and electronics. Based on the measurements of vehicle specific forces and rotation rates obtained from onboard inertial sensors, the positioning solution is obtained by numerically solving Newton's equations of motion.

The inertial navigation system is. in general. classified as a gimbaled configuration and a strapdown configuration. For a gimbled inertial navigation system, the accelerometers and gyros are mounted on a gimbaled platform to isolate the sensors from the rotations of the vehicle and then to keep the measurements and navigation calculations in a stabilized navigation coordinate frame. Generally, the motion of the vehicle can be expressed in several navigation frames of reference, such as earth centered inertial (ECI), earth-centered earth-fixed (ECEF), locally level with axes in the directions of north-east-down (NED), and locally level with a wander azimuth. For a strapdown inertial navigation system, the inertial sensors are rigidly mounted to the vehicle body frame. In order to perform the navigation computation in the stabilized navigation frame. a coordinate frame transformation matrix is used to transform the acceleration and rotation measurements gimbled from the body frame to one of the navigation frames.

In general, the measurements from the gimbled inertial navigation system are more accurate than the ones from the strapdown inertial navigation system. And, the gimbled inertial navigation system is easier in calibration than the strapdown inertial navigation system. However, the strapdown inertial navigation systems are more suitable for higher dynamic conditions (such as high turn rate maneuvers) which can stress inertial sensor performance. Also, with the availability of modern gyros and accelerometers, the strapdown inertial navigation systems become the predominant mechanization due to their low cost and reliability.

Inertial navigation systems, in principle, permit pure autonomous operation and output continuous position, velocity, and attitude data of the vehicle after initializing the starting position and initiating an alignment procedure. In addition to autonomous operation, other advantages of an inertial navigation system include the full navigation solution and wide bandwidth. However, an inertial navigation system is expensive and degraded with drift in output (position and velocity) over an extended period of time. It means that the position and velocity errors increase with time. This error propagation characteristic is primarily caused by, such as, gyro drift, accelerometer bias, misalignment, gravity disturbance, initial position and velocity errors, and scale factor errors.

Under the requirements, such as low cost, high accuracy, continuous output, high degree of resistance to jamming, and high dynamics, the stand-alone INS and stand-alone GPS have difficulties to perform properly. Therefore, to decrease or diminish the drawbacks for each system (INS and GPS), the integration of both systems is one of the ways to achieve the above requirements. In general, there are three conventional approaches for integrating the GPS and INS. The first approach is to reset directly the INS with the GPS-derived position and velocity. The second approach is the cascaded integration where the GPS-derived position and velocity are used as the measurements in an integration Kalman filter. The third approach is to use an extended Kalman filter which processes the GPS raw pseudorange and delta rang,e measurements to provide optimal error estimates of navigation parameters, such as the inertial navigation system, inertial sensor errors, and the global positioning system receiver clock offset.

However, there are some shortcomings of the above existing integration approaches and they are summarized as follows:

1. In the conventional global positioning system and inertial navigation system integration approaches, only position and velocity from the output of the GPS receiver or the GPS raw pseudorange and delta range measurements are used. However, the GPS raw phase measurements haven't been used for an integration solution although the phase measurements are accurate to a few millimeters in contrast to 30 centimeters for the P code pseudorange or 3 meters for the C/A code pseudorange in the presence of measurement noise.
2. There is a significant impediment to the aiding of the global positioning system signal tracking loops with an inertial navigation system. That is, the aiding causes the potential instability of the conventional global positioning system and inertial navigation integration system because of a positive feedback signal loop in the integrated global positioning and inertial system. As a result, the degradation in accuracy of the inertial aiding data increases the signal tracking errors. And, the increased tracking errors are fed back into the inertial system. This may cause further degradation of the inertial system because the measurements may severely affect the Kalman filter, which is well tuned for a low accuracy inertial navigation system.
3. The inertial sensors in the conventional tightly-coupled GPS and inertial integration system can not provide the high accuracy in velocity. Therefore, the aiding of a carrier phase tracking loop can not execute properly due to the need for high accuracy of the external input velocity.

SUMMARY OF THE PRESENT INVENTION

An objective of the present invention is to use the velocity and acceleration from an inertial navigation processor, which are corrected by a Kalman filter, as the aiding of the code and carrier phase tracking of the GPS satellite signals so as to enhance the performance of the GPS/INS, even in heavy jamming and high dynamic environments.

Another objective of the present invention is to improve the accuracy of the receiver position and velocity by using differential GPS. To accurately determine the receiver position and velocity at the centimeter level, the GPS phase measurements will be used and the differential GPS will be employed. In this invention, a new process (OTF (on-the-fly) technique) is disclosed to resolve the integer ambiguities on the fly and estimate the receiver position in real time. The results of GPS estimates will increase the accuracy of the inertial navigation system and therefore enhance the capability of the GPS tracking loop.

Another objective of the present invention is that the self-contained INS complements the GPS as the GPS receiver loses lock of the GPS signals. Once the GPS receiver regains the signals and then estimates the receiver position and velocity, the output (position and velocity) of the GPS receiver is used to correct the position and velocity of the INS that are drifted.

Another objective of the present invention is that a data link is used to receive the data, such as position, velocity, and raw measurements, from a reference site in addition to a GPS receiver to collect the raw measurements for a rover site. Using the differential GPS and phase measurements, the accuracy of the GPS positioning is of the order of centimeter level after fixing the integer ambiguities. As a result, the integrated GPS/INS is applicable in high accuracy positioning.

A further objective of the present invention is that the inertial navigation system can aid the resolution of the GPS carrier phase integer ambiguities by providing more accurate position information.

Another objective of the present invention is that the Kalman filter processes the GPS phase measurements as well as the GPS pseudorange and delta range from both reference and rover sites, so as to improve the accuracy of the integrated positioning solution.

Another objective of the present invention is that the Kalman filter is implemented in real time to optimally blend the GPS raw data and the INS solution and to estimate the navigation solution.

Another further objective of the present invention is that a robust Kalman filter is implemented in real time to eliminate the possible instability of the integration solution.

Another objective of the present invention is that a low accuracy inertial sensor is used to achieve a high accuracy integration solution by the aid of the global positioning system measurement.

Another objective of the present invention is to provide a real-time integrated vehicle positioning method, which can substantially solve the problem of instability present in many existing systems where a Kalman filter is used to perform optimal estimation.

Another objective of the present invention is to provide a real-time integrated vehicle positioning method, which supports high precision navigation in general aviation and space applications. It can also be used for ground motion vehicles tracking and navigation applications.

Another objective of the present invention is to provide a real-time integrated vehicle positioning method, which uses the GPS raw phase measurements to update the inertial navigation system and aids the GPS tracking loop by the accurate output of the inertial navigation system so as to satisfy the requirements of, such as low cost, high accuracy, continuous output, high degree of resistance to jamming, and high dynamics, and to overcome the disadvantages of the existing techniques.

DETAILED DESCRIPTION OF THE PRESENT EMBODIMENT

Figure 1:
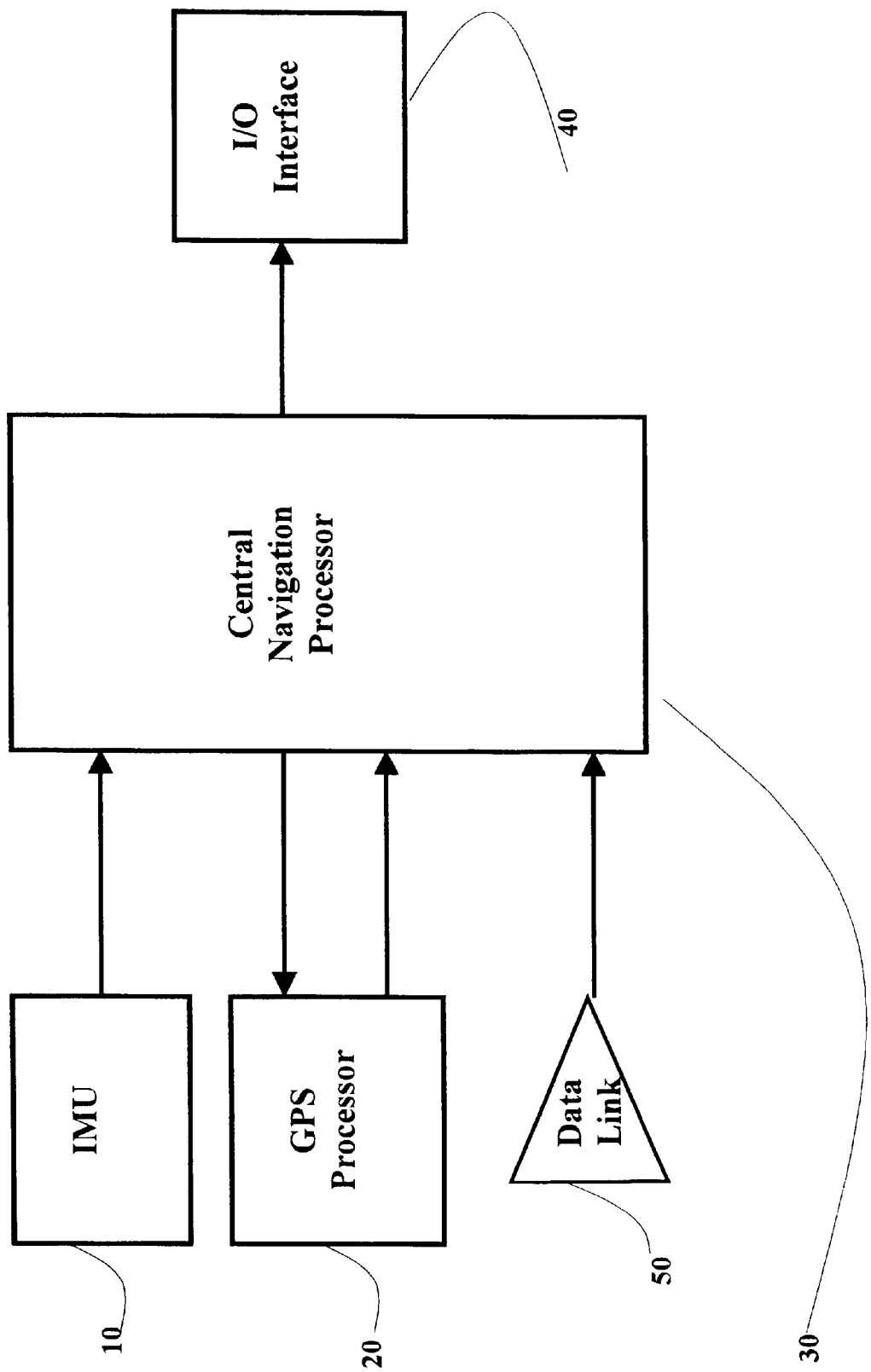
FIG. 1 is a block diagram illustrating an improved fully-coupled vehicle positioning method and system with differential GPS according to a preferred embodiment of the present invention, in which the global positioning system measurement and the inertial measurement are blended in a central navigation processor.

The real-time fully-coupled GPS/IMU vehicle positioning system with differential GPS of the present invention, as shown in FIG. 1, comprises an IMU (inertial measurement unit) 10 and a GPS (global positioning system) processor 20 which are connected to a central navigation processor 30. The navigation solution is output to an I/O (input/output) interface 40. To perform differential GPS, a data link 50, which is also connected to the central navigation processor 30, is used to receive the position, velocity, and raw measurements (pseudorange and phase) from the reference site. The central navigation processor 30 is responsible for all data processing tasks.

Figure 2:
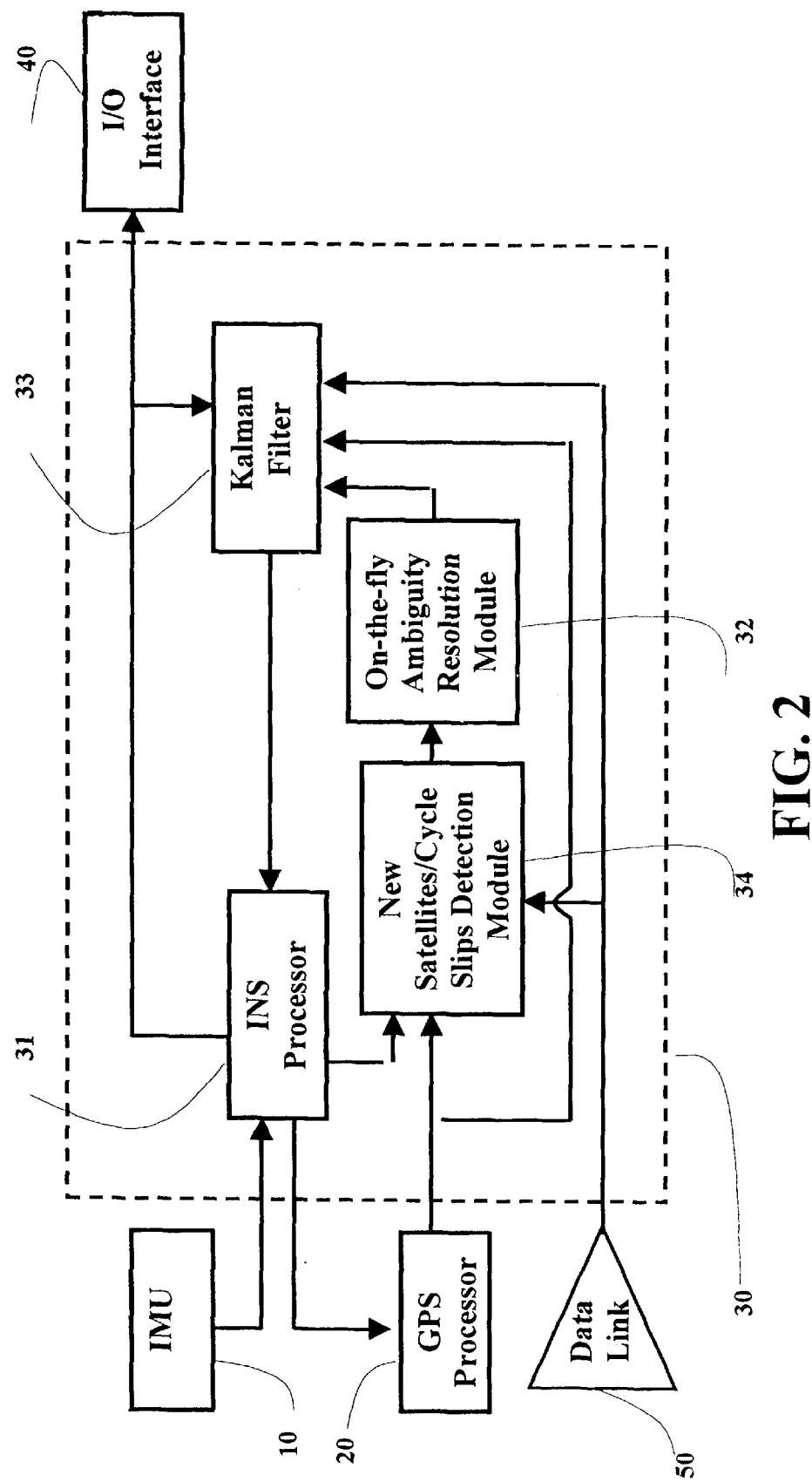
FIG. 2 is a block diagram of the central integrated navigation processing, including the global positioning system and inertial sensors, according to the above preferred embodiment of the present invention.

Referring to FIG. 1 and FIG. 2, the real-time fully-coupled global positioning system/inertial measurement unit (GPS/IMU) vehicle positioning process with differential GPS of the present invention comprises the following steps.

a) Receive GPS rover measurements (including pseudorange, carrier phase, and Doppler shift) from the GPS processor 20 and GPS reference measurements, position, and velocity from the data link 50, and then pass them to the central navigation processor 30. Receive inertial measurements (including body angular rates and specific forces) from the IMU 10 and then inject them into an INS processor 31 (as shown in FIG. 2) of the central navigation processor 30.

b) Combine the output of the INS (inertial navigation system) processor 31 and the GPS measurements in a Kalman filter 33 (as shown in FIG. 2).

c) Feed back the output of the Kalman filter 33 to the INS processor 31 to correct an INS navigation solution.

d) Inject the corrected velocity and acceleration data from the INS processor 31 into the GPS processor 20 to aid the code and carrier phase tracking of the global positioning system satellite signals.

e) Inject the outputs of the GPS processor 20, the data link 50, and the INS processor 31 into a new satellites/cycle slips detection module 34 to test the occurrence of new satellites and cycle slips. When the new satellites/cycle slips detection module 34 is on, an on-the-fly ambiguity resolution module 32 is activated.

f) Output carrier phase integer ambiguities as the ambiguities are fixed from the on-the-fly ambiguity resolution module 32 into the Kalman filter 33 to use the GPS carrier phase measurement to update the Kalman filter to further improve the positioning accuracy.

g) Output navigation data from the INS processor 31 to the I/O interface 40. The output of the I/O interface 40 can be connected to other on-board avionics systems.

The central navigation processor 30, as shown in FIG. 2, receives the measurements from the IMU 10, the GPS processor 20, and the data link 50. Then, the measurements are combined to derive high precision navigation information including 3-dimensional position, 3-dimensional velocity, and 3-dimensional attitude. The central navigation processor 30 further comprises the following modules:

The INS processor 31 receives inertial measurements including, body angular rates and specific forces from the IMU 10;outputs navigation data (position, velocity, and attitude) into the I/O interface 40. Therefore, other avionics systems can read the navigation data from the I/O interface 40. As mentioned before, the velocity and acceleration information from the INS processor 31 is also fed back to the GPS processor 20 to aid the GPS code and carrier phase tracking;

The GPS processor 20 receives GPS RF (radio frequency) signals from the GPS satellites and outputs the pseudorange, Doppler shifts, GPS satellite ephemerides, as well as atmospheric parameters to the Kalman filter 33;

The new satellites/cycle slips detection module 34 receives the navigation data from the INS processor 31, GPS rover measurement from the GPS processor 20. GPS reference measurement from the data link and determines if new GPS satellites come in view or cycle slips occur;

The on-the-fly ambiguity resolution module 32, which receives the navigation data from the INS processor 31, GPS rover measurement from the GPS processor 20, GPS reference measurement from the data link, is activated when new GPS satellites come in view or cycle slips occur to fix the ambiguity integer;

The Kalman filter 33 integrates the data from the INS processor 31, the GPS processor 20, and the data link 50 to estimate the position error, velocity error, and attitude error. Then, the INS processor 31 processes the inertial measurements, which are the body angular rates and specific forces, and the estimated errors from the Kalman filter 33 to derive the corrected navigation solutions (position, velocity, and attitude). The corrected navigation solutions are output into the Kalman filter 33 and also passed to the I/O interface 40 which provides a navigation data source for other avionics systems on board a vehicle.

It is well known that the receiver measurement noise for the L1 and L2 frequencies is about 1.9 mm and 2.4 mm respectively, while the receiver measurement noise for P(Y) and C/A codes is about 0.3 m and 3 m respectively. However, the high accuracy of positioning with GPS carrier phase measurements is based on the prior condition that the phase ambiguities have been resolved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, multipath effect, receiver clock error and receiver noise in range measurements from the GPS code and phase tracking loops.

For GPS measurements, the double difference equations for 1.1 and 1.2 frequencies are (scalar equations)

$$P_{k_{mr}}^{ij} = \rho_{mr}^{ij} + \rho_{c_{mr}}^{ij} + \frac{I_{mr}^{ij}}{f_k^2} + T_{mr}^{ij} + d_{pc_{k_{mr}}}^{ij} + M_{P_{k_{mr}}}^{ij} + \varepsilon_{P_{k_{mr}}}^{ij}$$

$$\Phi_{k_{mr}}^{ij} = \rho_{mr}^{ij} + \rho_{c_{mr}}^{ij} + \lambda_k N_{k_{mr}}^{ij} - \frac{I_{mr}^{ij}}{f_k^2} + T_{mr}^{ij} + d_{pc_{k_{mr}}}^{ij} + M_{\Phi_{k_{mr}}}^{ij} + \varepsilon_{\Phi_{k_{mr}}}^{ij},$$

$$(k = 1, 2)$$

where $(\cdot)_{mr}^{ij}$ means double difference which is formed by $(\cdot)_m^i - (\cdot)_m^j - (\cdot)_r^i + (\cdot)_r^j$. The subscripts m and r denote two (reference and rover) receivers and the superscripts i and j represent two different GPS satellites. P and $\Phi$ are tile pseudorange and phase range measurements, respectively. $\rho$ is the geometric distance between the phase centers of two antennas (a GPS user's receiver and a GPS satellite) at the nominal time and $\rho_c$ refers to the correction of nominal geometrical distance. $\lambda$ represents wavelength. $N_{mr}^{ij}$ is the double difference integer ambiguity.

$$\frac{I_{mr}^{ij}}{f_k^2}$$

is the double difference residual of the ionospheric effect for L1 or L2 frequency and $T_{mr}^{ij}$ denotes the double difference residual of the tropospheric effect. $d_{pc_{()mr}}^{ij}$ refers as the double difference residuals of phase center variations. $M_{(\cdot)mr}^{ij}$ denotes the double difference residuals of multipath effect. The definitions of the wide lane and narrow lane phase range measurements are $$\Phi_{wmr}^{ij} = \frac{f_1}{f_1 - f_2}\Phi_{1mr}^{ij} - \frac{f_2}{f_1 - f_2}\Phi_{2mr}^{ij}$$

$$\Phi_{wmr}^{ij} = \frac{f_1}{f_1 + f_2}\Phi_{1mr}^{ij} + \frac{f_2}{f_1 + f_2}\Phi_{2mr}^{ij},$$

respectively, and the corresponding integer ambiguities are $$N_{wmr}^{ij} = N_{1mr}^{ij} - N_{2mr}^{ij},$$

$$N_{nmr}^{ij} = N_{1mr}^{ij} + N_{2mr}^{ij}$$

respectively. Therefore, the frequencies for the wide lane and narrow lane ambiguities are equal to $f_r = f_1 - f_2$ and $f_n = f_1 + f_2$, respectively. Linearly combining the L1 and L2 equations and using $t_k$ to represent time at epoch k. the sequentially averaged approximated double difference wide lane ambiguity (real number) is expressed as $$\overline{N}_{wmr}^{ij}(t_k) = \frac{\sum_{i=1}^{k}\tilde{N}_{wmr}^{ij}(t_i)}{k} = \frac{(k-1)\overline{N}_{wmr}^{ij}(t_{k-1}) + \tilde{N}_{wmr}^{ij}(t_k)}{k} \quad (1)$$

and the approximated double difference narrow lane ambiguity (real number) is given by $$\tilde{N}_{nmr}^{ij} \sim (\lambda_w N_{wmr}^{ij} - \overline{\Phi}_{ISmr}^{ij} + d_{pc_{nmr}}^{ij} - d_{pc_{nmr}}^{ij})/\lambda_n, \quad (2)$$

where $$\tilde{N}_{wmr}^{ij} \sim (\Phi_{wmr}^{ij} - P_{nmr}^{ij} - d_{pc_{wmr}}^{ij} + d_{pc_{nmr}}^{ij})/\lambda_w,$$

$$\overline{\Phi}_{ISmr}^{ij}(t_k) = \frac{\sum_{i=1}^{k}\Phi_{ISmr}^{ij}(t_k)}{k} = \frac{(k-1)\overline{\Phi}_{ISmr}^{ij}(t_{k-1}) + \Phi_{ISmr}^{ij}(t_k)}{k},$$

$\Phi_{ISmr}^{ij} = \Phi_{wmr}^{ij} - \Phi_{nmr}^{ij}$ denotes the ionospheric signal observation.

$$P_{wmr}^{ij}\frac{f_1}{f_1 + f_2}P_{1mr}^{ij} + \frac{f_2}{f_1 + f_2}P_{2mr}^{ij},$$

$$d_{pc_{wmr}}^{ij} = \frac{f_1}{f_1 - f_2}d_{pc_{1mr}}^{ij} - \frac{f_2}{f_1 - f_2}d_{pc_{2mr}}^{ij}, \text{ and}$$

$$d_{pc_{wmr}}^{ij} = \frac{f_1}{f_1 + f_2}d_{pc_{1mr}}^{ij} + \frac{f_2}{f_1 + f_2}d_{pc_{2mr}}^{ij} \cdot \lambda_w$$

and $\lambda_n$ refer to the wavelengths of the wide lane and narrow lane ambiguities, respectively. Also, the ionosphere-free models for pseudorange and phase range are defined as $$P_{IF_{mr}}^{ij}\frac{f_1^2}{f_1^2 - f_2^2}P_{1mr}^{ij} - \frac{f_2^2}{f_1^2 - f_2^2}P_{2mr}^{ij}$$

$$\Phi_{IF_{mr}}^{ij}\frac{f_1^2}{f_1^2 - f_2^2}\Phi_{1mr}^{ij} - \frac{f_2^2}{f_1^2 - f_2^2}\Phi_{2mr}^{ij},$$

respectively.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal. Thus, the probability of signal loss or cycle slip is reduced.

Referring to FIG. 2. the on-the-fly ambiguity resolution module 32 is activated when the new satellites/cycle slips detection module 34 is on. Therefore, collects the position and velocity data from the INS processor 31. the rover raw and Doppler shift measurements from the GPS processor 20 and the reference raw measurements. Doppler shift measurements. position. and velocity from the data link 50 to fix the integer ambiguities. After fixing of the integer ambiguities, the integer ambiguities are passed to the Kalman filter 33 to further improve the measurement accuracy of the global positioning system raw data.

Figure 3:
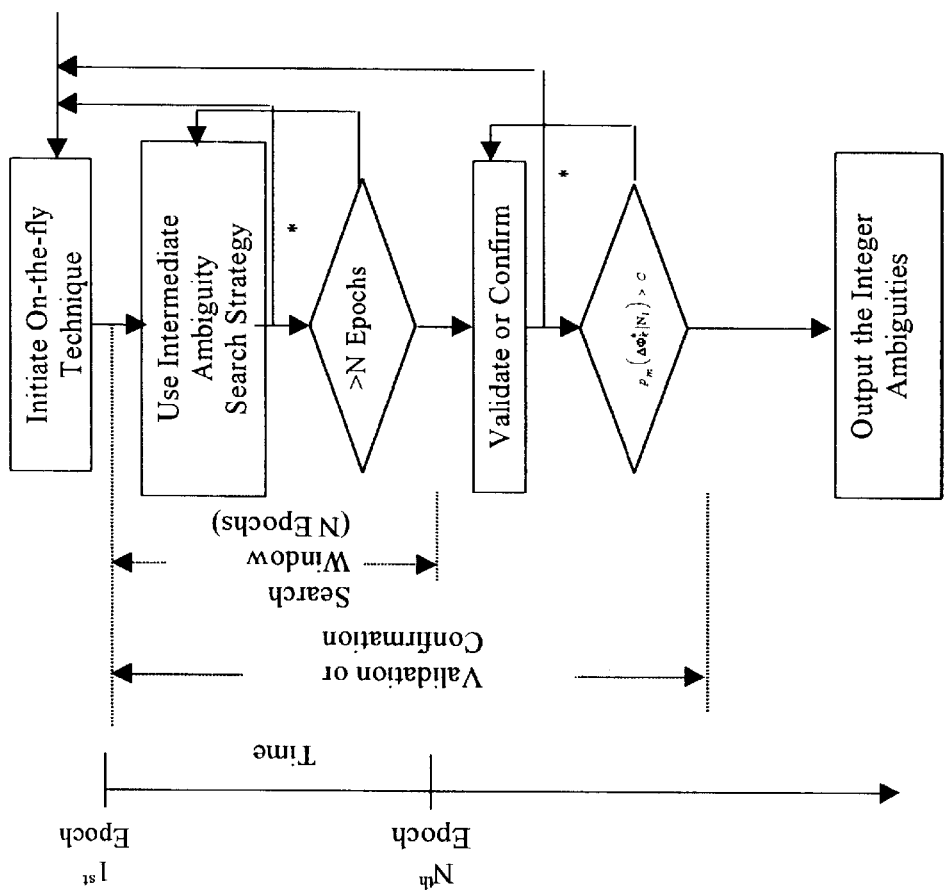
FIG. 3 is a flow diagram of the new process for on-the-fly ambiguity resolution technique of the present invention.

FIGS. 3, 4, 5, and 6 represent the method and process used for the on-the-fly ambiguity resolution module 32. FIG. 3 shows the process of the on-the-fly ambiguity resolution module 32. When the on-the-fly ambiguity resolution module 32 is on, a search window is set up. The search window comprises several time epochs (assumed N epochs). Within the search window, an intermediate ambiguity search strategy (IASS) is used to search an integer ambiguity set at each epoch.

The on-the-fly ambiguity resolution module 32 performs the following steps:
(a) initiating an on-the-fly ambiguity resolution module as the new satellites/cycle slips detection module is on. i.e., the new satellites or cycle slips occur;
(b) fixing integer ambiguities to estimate a more accurate vehicle navigation solution, and
(c) sending the selected integer ambiguities from the on-the-fly ambiguity resolution module to the Kalman filter.

The above step (b) further comprises:
(b.1) using intermediate ambiguity search strategy (IASS) and estimator bank to set up ambiguity set and determine the ambiguity integer; and
(b.2) validating and confirming the ambiguity integer.

Basically, IASS comprises the "simplified" least-squares method and the extrawidelaning technique. Before using the least-squares method to search the ambiguities, the observable common satellites between two antennas (reference and rover) are divided into two groups:

the primary satellites and the secondary satellites. Since the double difference equations are used, the satellite with the highest elevation is defined as the reference satellite. The primary satellites include the next four higher elevation satellites, i.e., there are four independent double difference equations.

The rest of the observable satellites are categorized into the secondary satellites.

Figure 4:
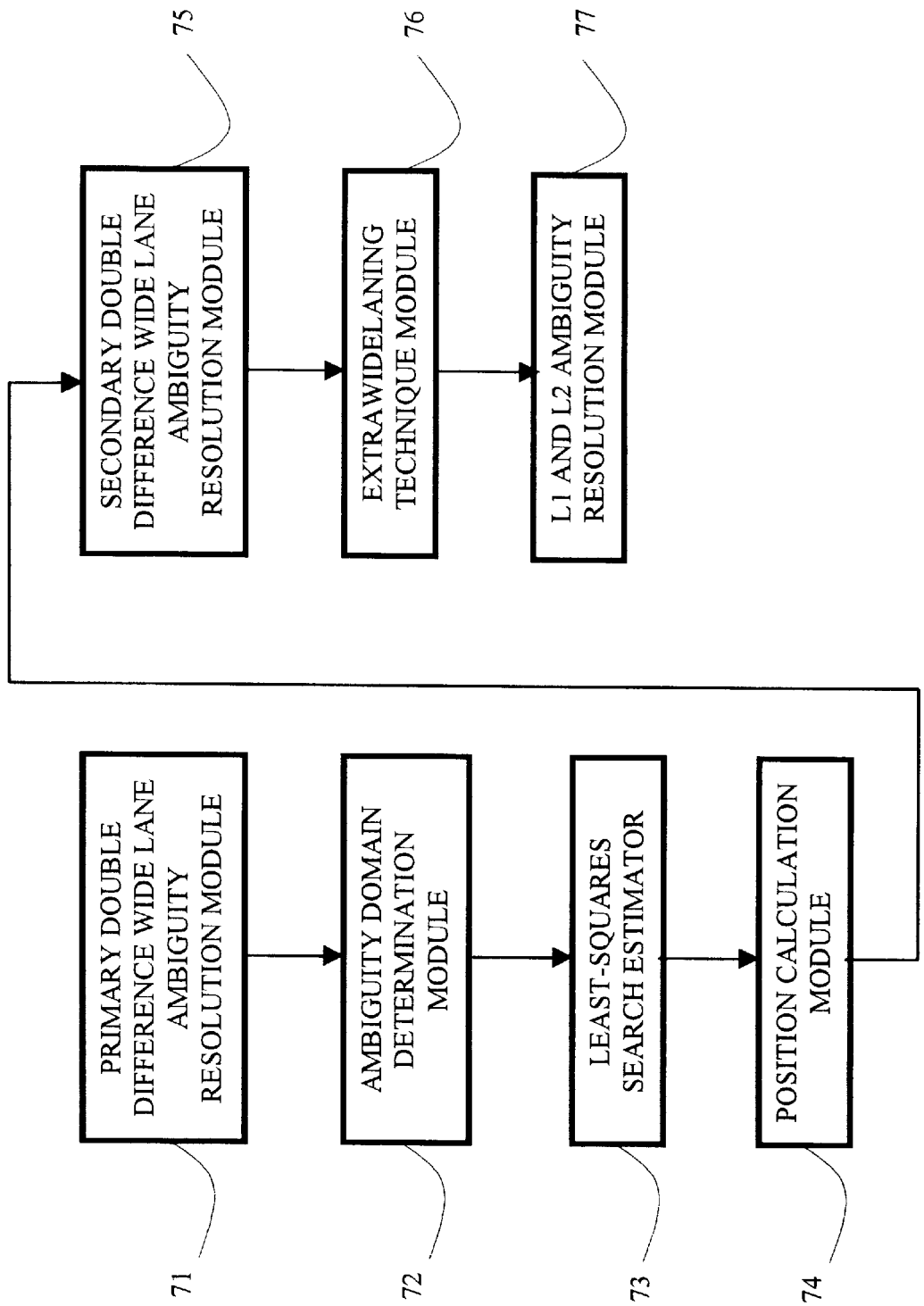
FIG. 4 is a flow diagram of intermediate ambiguity search strategy (IASS) according to the new process for on-the-fly ambiguity resolution technique of the present invention.

A s shown in FIG. 4, the IASS process comprises of a primary double difference wide lane ambiguity resolution module 71, an ambiguity domain determination module 72, a least-squares search estimator 73, a position calculation module 74, a secondary double difference wide lane ambiguity resolution module 75, an extrawidelaning technique module 76, and a L1 and L2 ambiguity resolution module 77.

The first step of the IASS is to resolve the primary double difference wide lane ambiguities in the primary double difference wide lane ambiguity resolution module 71. The priori information about the rover position (obtained from ionosphere-free pseudorange measurements) and the approximated double difference wide lane ambiguities (Equation (1)) a re combined with the primary double difference wide lane phase range measurements to form the simultaneous equations. Also, the priori information about the rover position can be given by the output of the INS processor 31. Use the minimum variance with the priori information to estimate the rover position and primary double difference wide lane ambiguities.

After the estimation of the primary double difference wide lane ambiguities, the estimated primary double difference wide lane ambiguities and the corresponding cofactor matrix are sent to the ambiguity domain determination module 72, wherein an ambiguity search domain is established based on the estimated double difference wide lane ambiguities and the corresponding cofactor matrix. The ambiguity search domain is sent to the least-squares search estimator 73. A standard least-squares search method is applied to search the ambiguity set in the least-squares search estimator 73. Also, the standard least-squares search method can be simplified to accelerate the ambiguity search. The "simplified" least-squares search method is defined as directly searching the ambiguity set, that minimizes the quadratic form of residuals $$R_1 = N(\hat{x}_N - n_i)^T P_{\hat{x}_N}^{-1}(\hat{x}_N - n_i)$$

where $\hat{x}_N$ is the optimal estimate vector of the double difference wide lane ambiguities (real number), $n_i$ is the double difference wide lane ambiguity vector within the search domain (integer number), and $P_{\hat{x}_N}$ is the cofactor matrix corresponding to the optimal double difference wide lane ambiguity estimate, without using statistical or empirical tests (because the estimator bank will execute the task of confirmation).

The fixed primary double difference wide lane ambiguities are sent to the position calculation module 74 to compute the rover position. The calculated rover position is sent to the secondary double difference wide lane ambiguity resolution module 75 to fix the secondary double difference wide lane ambiguities by applying the primary wide-lane-ambiguity-fixed rover position solution into the secondary double difference wide lane phase measurements.

Substituting the resolved double difference wide lane ambiguities into Equation (2), the approximated double difference narrow lane ambiguities (real numbers) are calculated. The extrawidelaning technique states that if the wide lane ambiguity is even (or odd), the corresponding narrow ambiguity is even (or odd), and vice versa. Using the extrawidelaning technique, the narrow lane ambiguities can be resolved in the extrawidelaning technique module 76. Therefore, in the L1 and L2 ambiguity resolution module 77, the L1 and L2 ambiguities are calculated from the combination of the wide lane ambiguities and narrow lane ambiguities, which correspond to $$N_{1mr}^{ij} = \frac{N_{wmr}^{ij} + N_{wmr}^{ij}}{2} \text{ and } N_{2mr}^{ij} = \frac{N_{wmr}^{ij} - N_{wmr}^{ij}}{2},$$

respectively.

Figure 5:
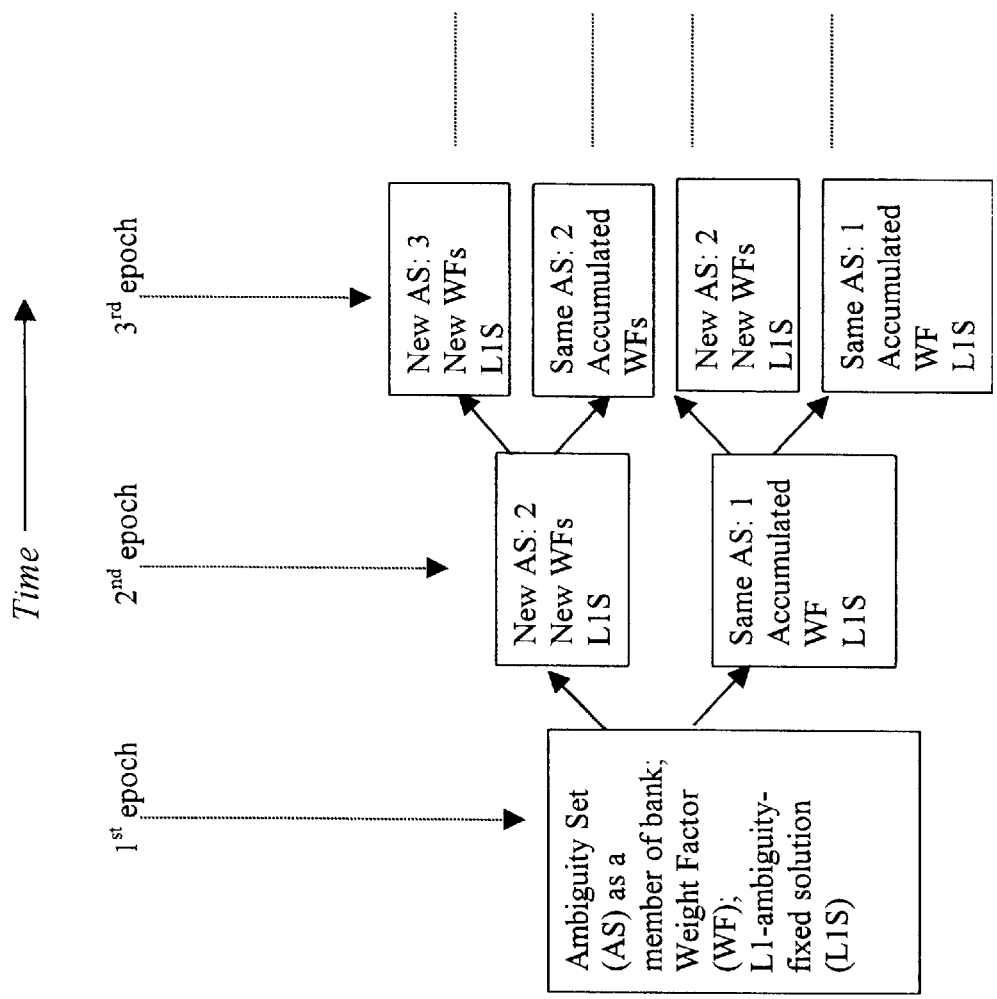
FIG. 5 is a block diagram of the procedure for forming the estimator bank according to the new process for on-the-fly ambiguity resolution technique of the present invention.
Figure 6:
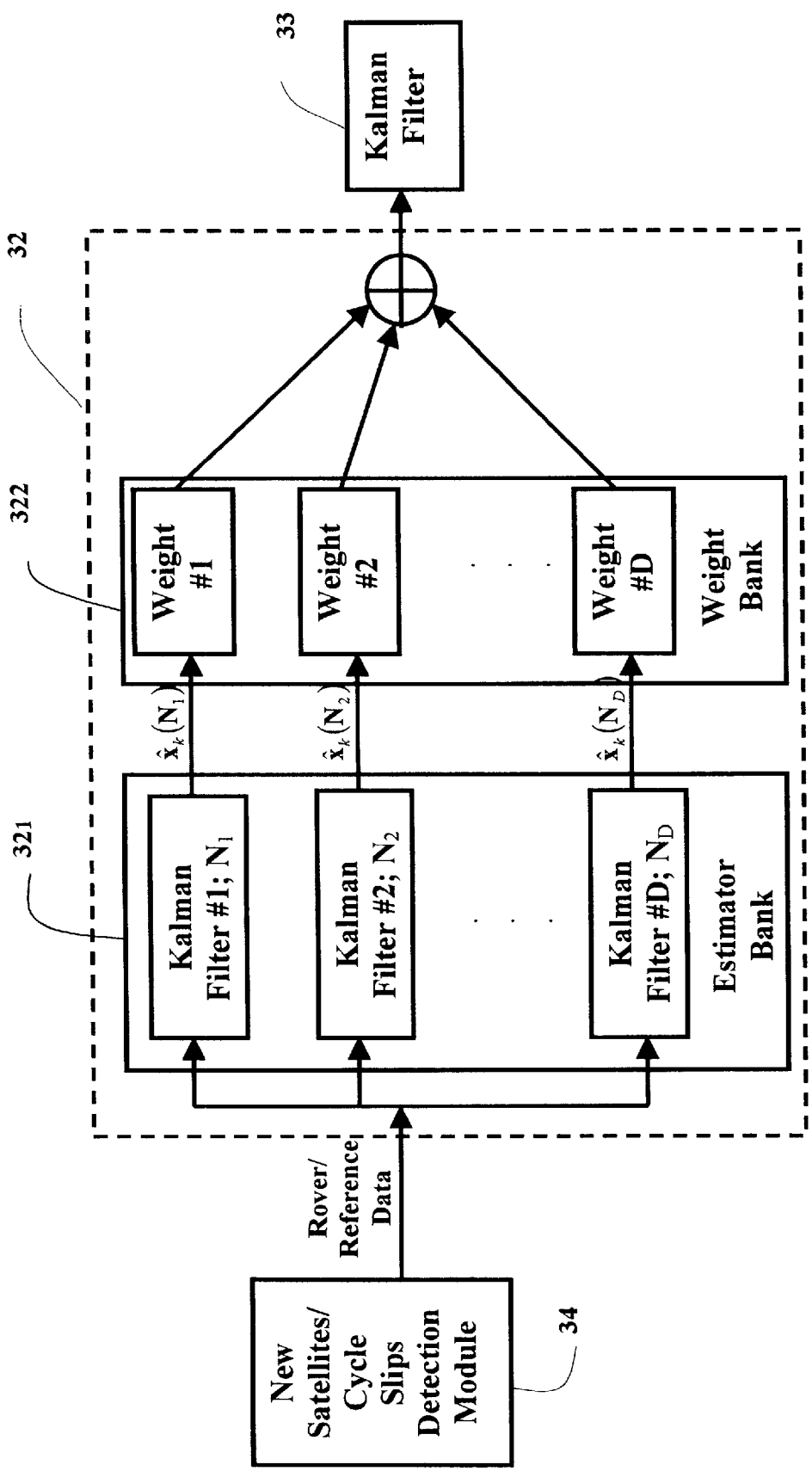
FIG. 6 is a complete form of the estimator bank according to the new process for on-the-fly ambiguity resolution technique of the present invention.

Returning to FIG. 3, when the current ambiguity set from the IASS is different from the one(s) from the previous epoch(s) the current ambiguity set becomes a new member of an estimator bank 321 and a corresponding weight bank 322. When the current ambiguity set is the same as one of the previous ambiguity set(s) in the estimator bank 321, the number of Kalman filters in the estimator bank 321 remains. The complete form of the estimator bank 321 and weight bank 322 is depicted in FIG. 6. The process for establishing the estimator bank 321 and weight bank 322 is shown in FIG. 5 and comprises the following steps:

Search the integer ambiguity set at the first epoch of the search window by using the IASS. The integer ambiguity set becomes a member of the estimator bank 321 because there is no member in the estimator bank 321 before the first epoch. Based on the ambiguity set and phase measurements, the rover position (ambiguity-fixed solution) is estimated and then a corresponding weight is calculated in the weight bank 322. The calculation of the weight is according to $$p_m(N_i \mid \Delta\Phi_k^*) = \frac{p_m(\Delta\Phi_k^* \mid N_i)}{\sum_{i=1}^{D} p_m(\Delta\Phi_k^* \mid N_i)}, \quad i = 1, 2, \ldots, D \quad (3)$$

where $$p_m(\Delta\Phi_k^* \mid N_i) = p_m(\Delta\Phi_k \mid \Delta\Phi_{k-1}, \Delta\Phi_{k-2}, \ldots, \Delta\Phi_1, N_i) \, p_m(\Delta\Phi_{k-1}^* \mid N_i),$$
$$i=1,2,\ldots,D \quad (4)$$

and the first term of the product can be expressed as $$p_m(\Delta\Phi_k \mid \Delta\Phi_{k-1}, \Delta\Phi_{k-2}, \ldots \Delta\Phi_1, N_i) =$$

$$\frac{1}{\sqrt{(2\pi)^r \det(cov(\Delta\Phi_k))}} \cdot \exp\left(-\frac{\hat{z}_k^T (cov(\Delta\Phi_k))^{-1} \hat{z}_k}{2}\right), \quad i = 1, 2, \ldots, D$$

which is assumed and defined as a Gaussian distribution. Equation (4) states the accumulative property of $p_m(\Delta\Phi_k^* \mid N_i)$, where $p_m(\Delta\Phi_k^* \mid N_i)$ represents the probability mass function of the measurement sequence $\Delta\Phi_k^* = \{\Delta\Phi_1, \Delta\Phi_2, \ldots, \Delta\Phi_k\}$ up to the current time $t_k$ conditioned by the individual ambiguity set $N_i$. In other words, the calculation of the weight depends on not only the data of the current epoch but also the data of the previous epochs. det(·) and (·)$^{-1}$ denote the determinant and the inverse of a matrix, respectively. $\hat{Z}_k$ is the optimal measurement residual (measurement value−the optimal computed value) at time $t_k$ and cov($\Delta\Phi_k$)=E$\{\hat{z}_k\hat{z}_k^\gamma\}$ is the covariance matrix of the measurement at the time $t_k$. r is the dimension of the measurement at each epoch. For the first epoch ($t_i$) (k=1) of the search window. Equation (4) (probability) becomes $$p_m(\Delta\Phi_1^* \mid N_l) = \frac{1}{\sqrt{(2\pi)^r det(cov(\Delta\Phi_k))}} \cdot \exp\left(-\frac{\hat{z}_k^T cov(\Delta\Phi_k)^{-1}\hat{z}_k}{2}\right), \quad (5)$$

$$i = 1, 2, \ldots, D.$$

Of course, the value of the only weight (D=1 in Equation (3)) in the weight bank 322 is equal to one. The optimal rover position for this epoch is equal to the rover position multiplied by the corresponding weight. Based on the optimal rover position and the Doppler shifts, the rover velocity is estimated.

Search the ambiguity set by using the IASS at the second epoch of the search window.

Two situations may occur:

2-1. When the integer ambiguity set is the same as the one of the previous epoch (epoch one), the number of the Kalman filters in the estimator bank 321 is still one, as shown in the lower part of FIG. 5. Based on the ambiguity set and the phase measurements (for epoch two), the rover position (ambiguity-fixed solution) can be estimated and the corresponding weight in the weight bank 322 is calculated cumulatively (i.e. Equations (3) and (4), where D=1). The optimal rover position for epoch two is equal to the rover position multiplied by the associated weight (naturally, for this case the value of the weight being equal to one). Based on the optimal rover position and the Doppler shifts, the rover velocity is estimated.

2-2. When the integer ambiguity set is different from the one of the previous epoch (epoch one), the current ambiguity set becomes a new member of the estimator bank 321, i.e., the number of the Kalman filters in the estimator bank 321 is two, as shown in the upper part of FIG. 5. Based on each ambiguity set and the same phase measurements (for epoch two), the individual rover position (ambiguity-fixed solution) can be estimated and the calculation of each corresponding weight in the weight bank 322 is based on Equations (3) and (5) (where D=2). In other words, when new ambiguity set is resolved, each corresponding weight in the weight bank 322 is calculated from scratch. The optimal rover position for epoch two is equal to the sum of the individual rover position multiplied by the associated weight. Based on the optimal rover position and the Doppler shifts, the rover velocity is estimated.

Follow the same procedure as described in step 2 for the rest of the epochs of the search window. At the last epoch (epoch N) of the search window, after the search of IASS, the estimator bank 321 and weight bank 322 are completely established (referred to FIG. 6).

Referring to FIG. 3, after the period of the search window, still, the phase measurements (reference and rover) are input into the complete estimator bank 321 (as shown in FIG. 6). As shown in FIG. 6, each Kalman filter in the estimator bank 321 has its own ambiguity set, which is selected by the IASS during the search window. Therefore, the number of the Kalman filters, D, in the estimator bank 321 is an arbitrary positive integer number which depends on the number of the different ambiguity sets from the search of the IASS during the search window. Based on each ambiguity set and the phase measurements, the individual rover position (ambiguity-fixed solution) can be estimated and each corresponding weight in the weight bank 322 is calculated cumulatively (based on Equations (3) and (4)). Thus, the optimal rover position is equal to the sum of the individual rover position multiplied by the associated weight. Based on the optimal rover position and the Doppler shifts, the rover velocity is estimated. Follow the same procedure until a criterion is met. The criterion is defined as $$p_m(\Delta\Phi_k^*|N_l) > C$$

where C denotes a very large uncertainty to make sure that the ambiguity set is robust enough. After the criterion is met, the estimator bank 321 and weight bank 322 stop functioning and output the selected integer ambiguities into the Kalman filter 33 (referred to FIG. 4). During the confirmation period (from the first epoch of the search window to the epoch when the estimator bank 321 and weight bank 322 stop functioning) the estimator bank 321 and the weight bank 322 identify the correct integer ambiguity set and estimate the rover position in real time. One important characteristic of the estimator bank 321 and weight bank 322 is that the weight in the weight bank 322 corresponding to the correct integer ambiguity in the estimator bank 321 is approaching one while the others (corresponding to the rest of the ambiguity sets) are converging to zero. Therefore, the correct (selected) integer ambiguity set is the one with the weight close to one. During the whole procedure, when new satellites or cycle slips occur, the on-the-fly ambiguity resolution module will be initiated (on).

Figure 7:
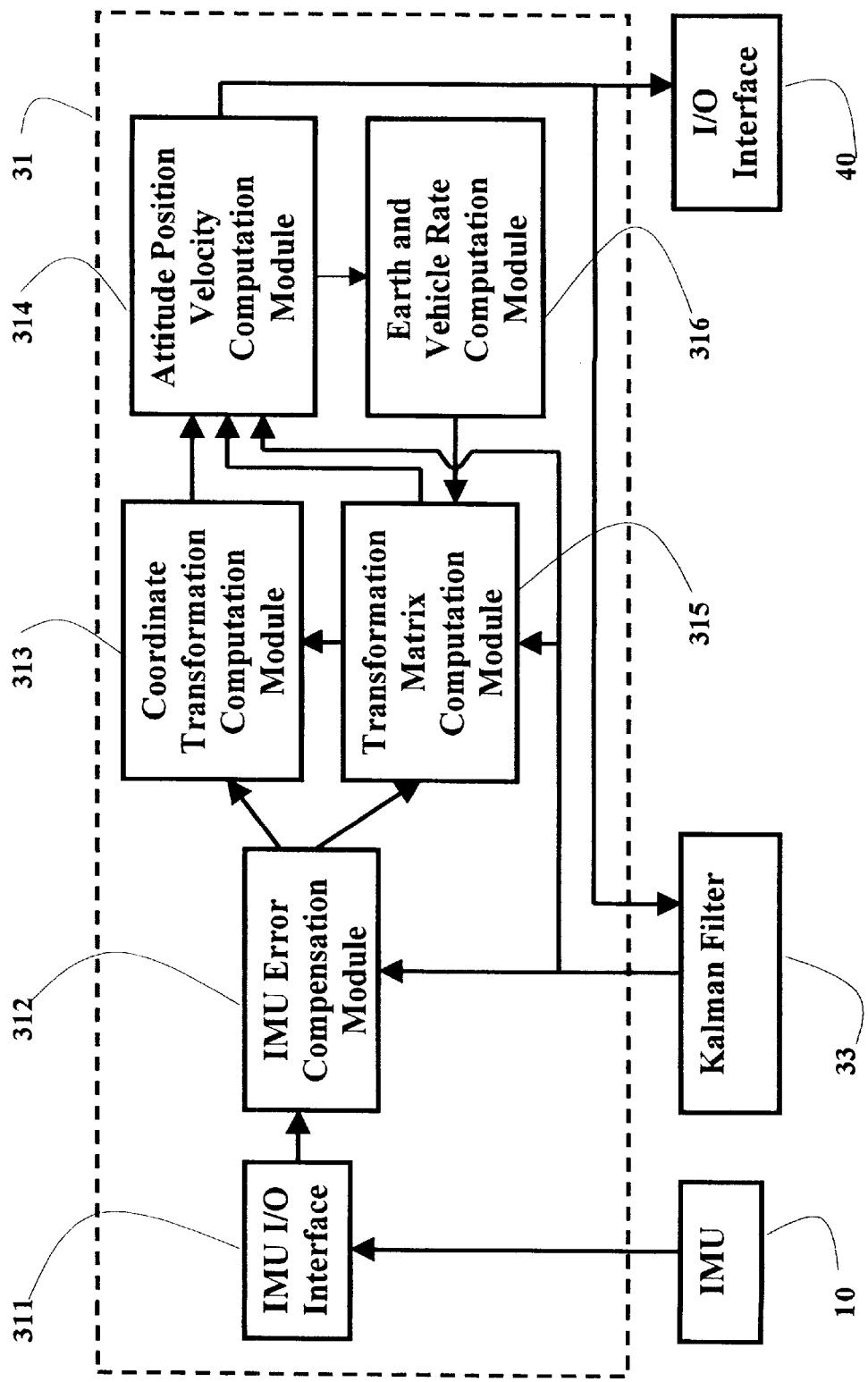
FIG. 7 is a block diagram of the inertial navigation system processing, which receives the navigation state corrections from a Kalman filter according to the above preferred embodiment of the present invention.

Referring to FIG. 7, the INS processor 31 comprises an IMU I/O interface 311, an IMU error compensation module 312, a coordinate transformation computation module 313, an attitude position velocity computation module 314, a transformation matrix computation module 315, and an earth and vehicle rate computation module 316.

The IMU I/O interface 311 collects the signal of the body angular rates and specific forces from the IMU 10 for processing and converting it to digital data, which are corrupted by the inertial sensor measurement errors. These contaminated data are passed to the IMU error compensation module 312. The IMU error compensation module 312 receives the sensor error estimates derived from the Kalman filter 33 to perform IMU error mitigation on the IMU data. The corrected specific forces and the body angular rates are sent to the coordinate transformation computation module 313 and the transformation matrix computation module 315 respectively.

In addition to the corrected body angular rates from the IMU error compensation module 315, the transformation matrix computation module 315 also receives the earth and vehicle rate from the earth and vehicle rate computation module 316 to perform transformation matrix computation. The transformation matrix computation module 315 sends the transformation matrix to the coordinate transformation computation module 313 and attitude position velocity computation module 314. The attitude update algorithm in the transformation matrix computation module 315 uses the quaternion method because of its advantageous numerical and stability characteristics. The differential equation of the relative quaternion between the body frame and the local navigation frame is:

$$\dot{q} = \tfrac{1}{2}[\Omega_b]q - \tfrac{1}{2}[\Omega_n]q$$

where $q^T = [q_0 \; q_1 \; q_2 \; q_3]$ is a four-component vector of quaternion parameters and the four components are defined as follows:

$$q_0 = \cos\frac{\Delta\theta}{2}$$

$$q_1 = \cos\alpha \sin\frac{\Delta\theta}{2}$$

$$q_2 = \cos\beta \sin\frac{\Delta\theta}{2}$$

$$q_3 = \cos\gamma \sin\frac{\Delta\theta}{2}$$

where $\Delta\theta$ is the rotation angle and $\alpha$, $\beta$, and $\gamma$ are the angles between the axis of rotation and the axes of a coordinate system. For instance, they are the angles with respect to the roll, pitch, and yaw axes. Also, the quaternions satisfy the condition $$q_0^2+q_1^2+q_2^2+q_3^2=1.$$

$\Omega_b$ is the skew-symmetric matrix of the vector, $\omega_{ib}^b$, which is sensed by the gyro and is the rotation rate vector of the body frame (b) relative to the inertial frame (i) in the body frame, and both are expressed as $$[\Omega_n] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix}, \omega_{ib}^b = [\omega_{bx}, \omega_{by}, \omega_{bz}]^T.$$

$\Omega_n$ is the skew-symmetric matrix of the vector, $\omega_m^n$, which is the rotation rate vector of the local navigation frame (n) relative to the inertial frame in the navigation frame, and both are expressed as $$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix}, \omega_{in}^n = [\omega_{nx}, \omega_{ny}, \omega_{nz}]^T.$$

If the navigation frame is the local level North, East, and Down (NED) navigation frame, then $$\omega_{in}^n = \begin{bmatrix} (\omega_c + \lambda)\cos L \\ -\dot L \\ -(\omega_c + \lambda)\sin L \end{bmatrix}$$

where $\omega_c$ is the Earth's rotation rate, L is the geodetic latitude, and $\lambda$ is the longitude.

The coordinate transformation module 313 collects the specific forces from the IMU error computation module 312 and the transformation matrix from the transformation matrix computation module 315 to perform the coordinate transformation. The coordinate transformation computation sends the specific forces transferred into the coordinate system presented by the transformation matrix to the attitude position velocity computation module 314.

The attitude position velocity computation module 314 receives the transformed specific forces from the coordinate transformation computation module 313 and the transformation matrix from the transformation matrix computation module 315 to perform the attitude, position, and velocity update. A general navigation equation that describes the motion of a point mass over the surface of the Earth or near the Earth has the following form:

$$\dot V(t)=a-(2\omega_{ic}+\omega_{cn})\times V-\omega_{ic}\times\omega_{ic}\times r$$

where a and V are the acceleration and velocity of the vehicle relative to the Earth in the navigation frame, $\omega_{ic}$, is the Earth rotation vector, $\omega_{cn}$, is the angular rate of the navigation frame relative to the earth, and r is the position vector of the vehicle with respect to the Earth's center.

Because the accelerometers do not distinguish between vehicle acceleration and the mass attraction gravity, the specific vector, f, sensed by the accelerometers is:

$$f=a-g(r)$$

where g(r) is a combination of the earth's gravity and the centrifugal force at the vehicle location. Thus, $$\dot V(t)=f-(2\omega_{ic}+\omega_{cn})\times V+g(r)$$

$$\text{where, } \omega_{ic}^n = \begin{bmatrix} \omega_c \cos L \\ 0 \\ -\omega_c \sin L \end{bmatrix}, \omega_{cn}^n = \begin{bmatrix} \dot\lambda \cos L \\ -\dot L \\ -\dot\lambda \sin L \end{bmatrix}.$$

The vehicle velocity is updated by the following:

$$\dot V^n = C_b^n f^b + MV^n + g^n$$

where $C_b^n$ is the direction cosine matrix from the body frame to the navigation frame, $$f^b = \begin{bmatrix} f_{bx} \\ f_{by} \\ f_{bz} \end{bmatrix}, V^n = \begin{bmatrix} v_n \\ v_c \\ v_d \end{bmatrix}, g^n = \begin{bmatrix} 0 \\ 0 \\ g_d \end{bmatrix}, \text{ and}$$

$$M = \begin{bmatrix} 0 & -(2\omega_c + \dot\lambda)\sin L & \dot L \\ (2\omega_c + \dot\lambda)\sin L & 0 & (2\omega_c + \dot\lambda)\cos L \\ -\dot L & -(2\omega_c + \dot\lambda)\cos L & 0 \end{bmatrix}$$

For the WGS-84 ellipsoid, the normal gravity formula is the following expression:

$$g_d = g_0\left[1 - 2(1 + f + m)\frac{h}{a} + \left(\frac{5}{2}m - f\right)\sin^2 L\right]$$

where $m=\omega_{ic}^2 a^2 b/GM$, $g_0$ is the gravity at the equator, f is the elliptical flattening, h is the altitude, a is the semi-major axis value, b is the semi-minor axis value, and GM is the earth's gravitational constant.

The differential equations for the position update of the geodetic latitude, L, longitude, $\lambda$, and height, h, are given by:

$$\dot L = \frac{V_n}{R_M + h}, \dot\lambda = \frac{V_c}{(R_N + h)\cos L}, \dot h = -v_d$$

where $R_M$ is the radius of the curvature in the Meridian and $R_A$ is the radius of the prime vertical.

After the computation of the position and velocity, the position and velocity errors calculated by the Kalman filter 33 are used in the attitude position velocity computation module 314 to correct the inertial solution. For the attitude correction, there are two executable approaches. First approach is to send the attitude errors computed by the Kalman filter 33 to the attitude position velocity computation module 314 to perform attitude correction in the attitude position velocity computation module 314. The second approach is to send the attitude errors computed by the Kalman filter 33 to the transformation matrix computation module 315 to perform the attitude correction before the attitude position velocity computation module 314.

The corrected inertial solution obtained from the attitude position velocity computation module 314 is passed to the Kalman filter 33 to construct the measurements of the Kalman filter 33. The corrected inertial navigation solution is also sent to the carrier phase integer ambiguity resolution module 32 to aid the resolution of the integer ambiguities. The corrected velocity and acceleration is passed to the GPS processor 20 to aid the global positioning system satellite signal carrier phase and code tracking. Also, the attitude, position, and velocity information is sent to the I/O interface 40 which provides a navigation data source for other avionics systems onboard a vehicle. Furthermore, the attitude, position, and velocity computed by the attitude position velocity computation module 314 are sent to the earth and vehicle rate computation module 316 to calculate the Earth rotation and the vehicle rotation rate. The calculated Earth and vehicle rates are sent to the transformation matrix computation module 315.

It is well known that the Kalman filter produces optimal estimates with well defined statistical properties. The estimates are unbiased and the y have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the real-time fully-coupled GPS/IMU positioning process and system with differential GPS, an alternative of the Kalman filter for position and attitude derivation is a robust Kalman filter. The robust Kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

A robust Kalman filter has the characteristic that it provides near-optimum performance over a large class of process and measurement models. The pure Kalman filter is not robust since it is optimal for only one particular process and measurement model. If the Kalman filter is not correct, the Kalman filter covariance may report accuracy which is different from what can actually be achieved. The purpose of filter integrity is to ensure that the predicted performance from the error covariance is close with respect to the actual estimation error statistics. In addition, filter divergence is usually caused by a changing process, measurement model, or a sensor failure.

Figure 8:
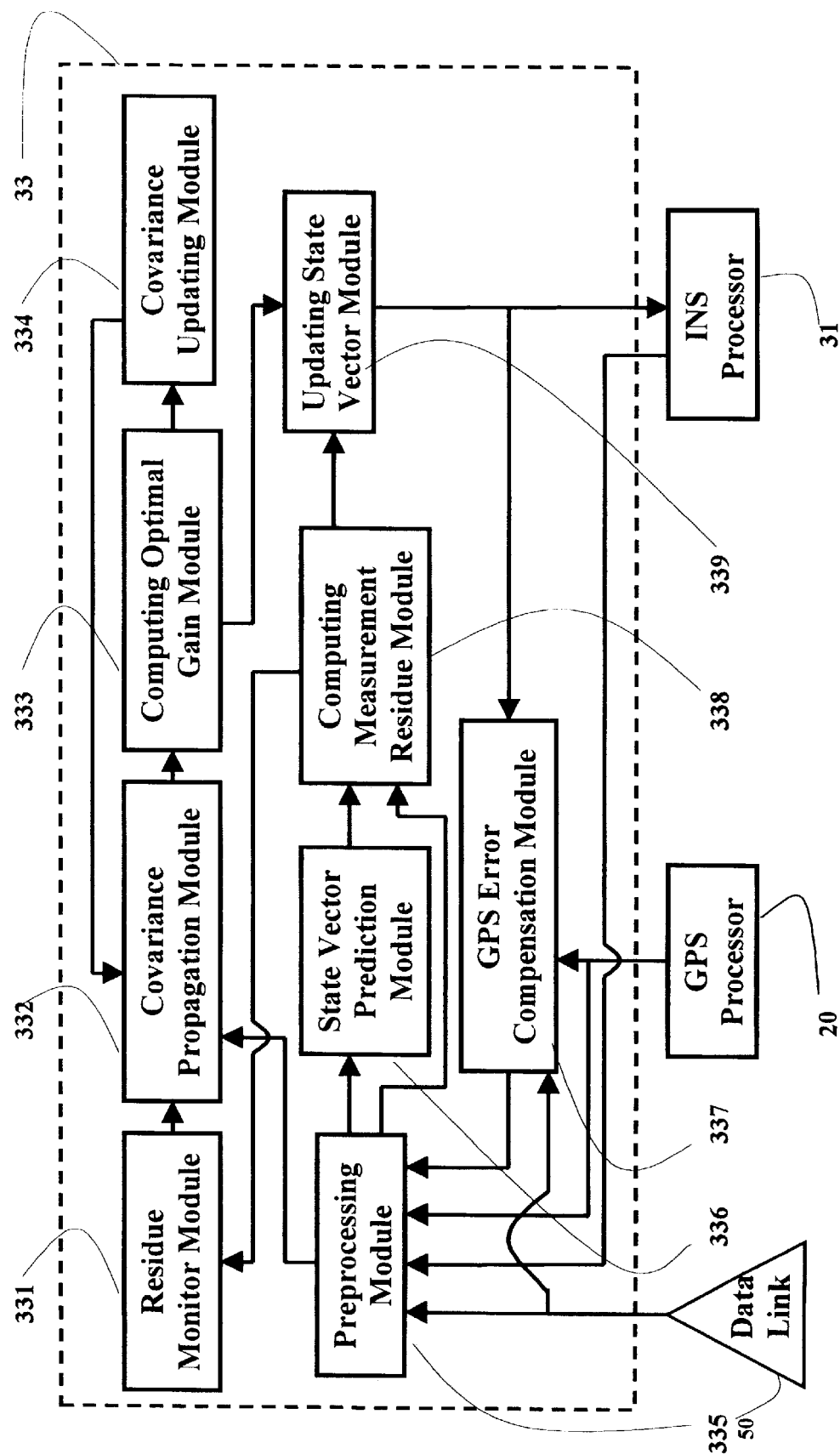
FIG. 8 is a block diagram of the robust Kalman filter implementation according to the above preferred embodiment of the present invention.

This present invention uses a residual monitoring method to obtain the robust Kalman filter which is used to blend the global positioning system raw data and the inertial sensor measurements. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 8 gives the implementation of the robust Kalman filter including a residual monitoring function.

As shown in FIG. 8, a GPS error compensation module 337 gathers the GPS rover raw measurements (including pseudorange, carrier phase, and Doppler shift) from the GPS processor 20, the GPS reference raw measurements, position, and velocity from the data link 50, and the position and velocity corrections from an updating state vector module 339 to perform GPS error compensation. The corrected GPS raw data are sent to the preprocessing module 335.

A preprocessing module 335 receives the GPS satellite ephemeris from the GPS processor 20, the corrected GPS reference and rover raw data from the GPS error compensation module 337, and INS solutions from the INS processor 31. The preprocessing module 335 performs the calculation of the state transit matrix and sends it as well as the previous state vector to a state vector prediction module 336. The calculated state transit matrix is also sent to a covariance propagation module 332. The preprocessing module 335 calculates the measurement matrix and the current measurement vector according to the computed measurement matrix and the measurement model. The measurement matrix and the computed current measurement vector are passed to a computing measurement residue module 338.

The state vector prediction module 336 receives the state transition matrix and the previous state vector from the preprocessing module 335 to perform state prediction of the current epoch. The predicted current state vector is passed to the computing measurement residue module 338.

The computing measurement residue module 338 receives the predicted current state vector from the state vector prediction module 336 and the measurement matrix and the current measurement vector from the preprocessing module 335. The computing measurement residue module 338 calculates the measurement residues by subtracting the multiplication of the measurement matrix and the predicted current state vector from the current measurement vector. The measurement residues are sent to a residue monitor module 331 as well as the updating state vector module 339.

The residue monitor module 331 performs a discrimination on the measurement residues received from the computing measurement residue module 338. The discrimination law is whether the square of the measurement residues divided by the residual variance is larger than a given threshold. If the square of the measurement residues divided by the residual variance is larger than this given threshold, the current measurement may lead to the divergence of the Kalman filter. When it occurs, the residue monitor module 331 calculates a new covariance of the system process or rejects the current measurement. If the square of the measurement residues divided by the residual variance is less than this given threshold, the current measurement can be used by the Kalman filter without changing the current covariance of system process to obtain the current navigation solution. The covariance of the system process is sent to the covariance propagation module 332.

The covariance propagation module 332 gathers the covariance of the system process from the residue monitor module is the state transition matrix from the preprocessing module 335, and the previous covariance of estimated error to calculate the current covariance of the estimated error. The computed current covariance of the estimated error is sent to a computing optimal gain module 333.

The computing optimal gain module 333 receives the current covariance of the estimated error from the covariance computing module 332 to compute the optimal gain. This optimal gain is passed to a covariance updating module 334 as well as the updating state vector module 339. The covariance updating module 334 updates the covariance of the estimated error and sends it to the covariance propagation module 332.

The updating state vector module 339 receives the optimal gain from the computing optimal gain module 333 and the measurement residues from the computing measurement residue module 338. The updating state vector module 339 calculates the current estimate of the state vector including position, velocity and attitude errors and sends them to the GPS error compensation module 337 and the INS processor 1.

In view of the above, the present invention can provide a real-time fully-coupled vehicle positioning process and system with differential GPS to substantially solve the problems encountered in global positioning system-only and inertial navigation system-only, such as loss of global positioning satellite signal, sensitivity to jamming and spoofing, and the inertial solution's drift over time. Therefore, the following features and advantages can thus be achieved:

(1) The velocity and acceleration from an inertial navigation processor are used to aid the code and carrier phase tracking of the global positioning system satellite signals, so as to enhance the performance of the global positioning and inertial integration system, even in heavy jamming and high dynamic environments.

(2) The velocity and acceleration from an inertial navigation processor are corrected by a Kalman filter and used to aid the code and carrier phase tracking of the global positioning system satellite signals, so as to enhance the performance of the global positioning and inertial integration system, even in heavy jamming and high dynamic environments.

(3) To accurately determine the receiver position and velocity at the centimeter level, the GPS phase measurements will be used and the differential GPS will be employed. In this invention, a new process (OTF (on-the-fly) technique) is proposed to resolve the integer ambiguities on the fly and estimate the receiver position in real time. The results of GPS estimates will increase the accuracy of the inertial navigation system and therefore enhance the capability of the GPS tracking loop.

(4) To perform the differential GPS, the data link 50 (as shown in FIG. 2) is used to receive the raw measurements, position, and velocity from a reference site.

(5) The self-contained INS complements the GPS as the GPS receiver suffers the loss of the GPS signals. Once the GPS receiver regains the signals and then estimates the receiver position and velocity, the output (position and velocity) of the GPS receiver is used to correct the position and velocity of the INS that has drifted.

(6) The inertial navigation system aids the satellite signal integer ambiguity resolution of the global positioning system by providing more accurate position information.

(7) The integrated navigation solution of the global positioning system and the inertial measurement unit aids the satellite signal integer ambiguity resolution of the global positioning system by providing more accurate position information.

(8) The satellite signal carrier phase measurements (reference and rover) are used in the Kalman filter, as well as the pseudorange and delta range of the global positioning system, so as to improve the accuracy of the integration positioning solution.

(9) The Kalman filter is implemented in real time to optimally blend the global positioning system raw data and the inertial navigation solution and to estimate the navigation solution.

(10) The robust Kalman filter is implemented in real time to eliminate the possible instability of the integration solution.

(11) Low accuracy inertial sensor is used for achieving a high accuracy integration solution due to the aiding of the global positioning system measurements.

What is claimed is:

1. A real-time integrated vehicle positioning system with differential GPS, comprising:

a global positioning system (GPS) processor for providing GPS rover measurements including pseudorange, carrier phase, and Doppler shift;

a data link for receiving GPS measurements including pseudorange, carrier phase, Doppler shift, position, and velocity from a reference site;

an inertial measurement unit (IMU) for providing inertial measurements including body angular rates and specific forces;

a central navigation processor, which is connected with said GPS processor, said IMU and said data link, comprising an inertial navigation system (INS) processor, a Kalman filter, a new satellites/cycle slips detection module, and an on-the-fly ambiguity resolution module; and an input/output (I/O) interface connected to said central navigation processor;

wherein said GPS measurements from said GPS processor and said data link are passed to said central navigation processor and said inertial measurements are injected into said inertial navigation system (INS) processor;

wherein an output of said INS processor and said GPS measurements are blended in said Kalman filter; an output of said Kalman filter is fed back to said INS processor to correct an INS navigation solution, which is then output from said central navigation processor to said I/O interface;

wherein said INS processor provides velocity and acceleration data injected into said GPS processor to aid code and carrier phase tracking of GPS satellite signals;

wherein an output of said GPS processor, an output of said data link, and an output of said INS processor are injected into a new satellites/cycle slips detection module to test the occurrence of new satellites and cycle slips, wherein as said new satellites/cycle slips detection module is on, said on-the-fly ambiguity resolution module is activated to resolve global positioning system satellite signal carrier phase integer ambiguities;

wherein said on-the-fly ambiguity resolution module outputs the integer ambiguities into said Kalman filter to further improve positioning accuracy, and said INS processor outputs navigation data to said I/O interface.

2. The real-time integrated vehicle positioning system, as recited in claim 1, wherein said GPS processor outputs pseudorange, Doppler shifts, global positioning system satellite ephemeris, and atmosphere parameters to said Kalman filter.

3. The real-time integrated vehicle positioning system, as recited in claim 2, wherein said INS processor processes said inertial measurements, which are body angular rates and specific forces, and a position error, a velocity error, and an attitude error coming from said Kalman filter to derive said corrected navigation solution.

4. The real-time integrated vehicle positioning system, as recited in claim 3, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects signals of said body angular rates and specific forces from said IMU for processing and converting to digital data which are corrupted by inertial sensor measurement errors to form contaminated data that are passed to said IMU error compensation module, wherein said IMU error compensation module receives sensor error estimates derived from said Kalman filter to perform IMU error mitigation on said IMU data, wherein said corrected inertial data are sent to said coordinate transformation computation module and said transformation matrix computation module, where said body angular rates are sent to said transformation matrix computation module and said specific forces are sent to said coordinate transformation computation module, wherein said transformation matrix computation module receives said body angular rates from said IMU error computation module and an earth and vehicle rate from said earth and vehicle rate computation module to perform transformation matrix computation, wherein said transformation matrix computation module sends said transformation matrix to said coordinate transformation computation module and said attitude position velocity computation module, wherein said coordinate transformation module collects said specific forces from said IMU error computation module and said transformation matrix from said transformation matrix computation module to perform said coordinate transformation, wherein said coordinate transformation computation sends said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform an attitude, position, velocity update.

5. The real-time integrated vehicle positioning system, as recited in claim 4, wherein after computation of said position and velocity, position and velocity errors which are calculated by said Kalman filter are used in said attitude position velocity computation module to correct an inertial solution.

6. The real-time integrated vehicle positioning system, as recited in claim 5, wherein said attitude error computed by said Kalman filter is sent to said attitude position velocity computation module to perform an attitude correction in said attitude position velocity computation module.

7. The real-time integrated vehicle positioning system, as recited in claim 5, wherein said attitude error computed by said Kalman filter is sent to said attitude position velocity computation module to perform an attitude correction in said attitude position velocity computation module.

8. The real-time integrated vehicle positioning system, as recited in claim 5, wherein the corrected inertial solution, which is obtained from said attitude position velocity computation module, is passed to said Kalman filter to construct said measurements, moreover a corrected inertial navigation solution is also sent to said new satellites/cycle slips detection module, and said on-the-fly ambiguity resolution module to aid said global positioning system satellite carrier phase integer ambiguity fixing, and that corrected velocity and acceleration are passed to said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

9. The real-time integrated vehicle positioning system, as recited in claim 6, wherein the corrected inertial solution, which is obtained from said attitude position velocity computation module, is passed to said Kalman filter to construct said measurements, moreover a corrected inertial navigation solution is also sent to said new satellites/cycle slips detection module, and said on-the-fly ambiguity resolution module to aid said global positioning system satellite carrier phase integer ambiguity fixing, and that corrected velocity and acceleration are passed to said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

10. The real-time integrated vehicle positioning system, as recited in claim 7, wherein the corrected inertial solution obtained from said attitude position velocity computation module is passed to said Kalman filter to construct said measurements, moreover the corrected inertial navigation solution is also sent to said new satellites/cycle slips detection module, and said on-the-fly ambiguity resolution module to aid said global positioning system satellite carrier phase integer ambiguity fixing, and that the corrected velocity and acceleration is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

11. The real-time integrated vehicle positioning system, as recited in one of claims 1 to 10, wherein said Kalman filter is a robust Kalman filter for providing near-optimal performance over a large class of process and measurement models and for blending GPS measurements and inertial sensor measurements.

12. The real-time integrated vehicle positioning system, as recited in claim 11, wherein said robust Kalman filter comprises a GPS error compensation module for gathering said pseudorange, said carrier phase, and said Doppler shift of said GPS measurements from said GPS processor and said data link, and position and velocity corrections from an updating state vector module to perform GPS error compensation to form corrected GPS raw data, including a pseudorange, a carrier phase, and a Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with a state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating a current estimate of state vector including position, velocity and attitude errors and sending to said GPS error compensation module and said INS processor.

13. The real-time integrated vehicle positioning system, as recited in one of claims 1 to 10, wherein said on-the-fly ambiguity resolution module collects position and velocity data from said INS processor, said carrier phase and Doppler shift measurement from said GPS processor and said datalink, and covariance matrix from said Kalman filter to fix said global positioning system satellite signal integer ambiguity number, wherein after fixing of carrier phase ambiguities, said carrier phase ambiguity number is passed to said Kalman filter to further improve a measurement accuracy of a global positioning system raw data.

14. A real-time integrated vehicle positioning method with differential GPS, comprising the steps of:

(a) receiving global positioning system (GPS) raw measurements of a vehicle, including pseudorange, carrier phase, and Doppler shift; at the same time, receiving the raw measurements, position, and velocity from a reference site through a data link;

(b) sending said GPS raw measurements to a central navigation processor from a GPS processor and said data link;

(c) receiving a plurality of inertial measurements of said vehicle including body angular rates and specific forces from an inertial measurement unit (IMU);

(d) sending said inertial measurements from said IMU to an inertial navigation system (INS) processor of said central navigation processor for computing an inertial navigation solution which includes position, velocity, acceleration, and attitude of said vehicle;

(e) fixing integer ambiguities by testing an occurrence of new satellites or cycle slips using said GPS raw measurements from said GPS processor, OPS reference raw measurements, position, and velocity from said data link, and said inertial navigation solution from said INS processor, and sending said integer ambiguities to a Kalman filter;

(f) blending said inertial navigation solution derived from said INS processor and said GPS raw measurements from said GPS processor and said data link in said Kalman filter to derive INS corrections and GPS corrections;

(g) feeding back said INS corrections from said Kalman filter to said INS processor to correct said inertial navigation solution; and (h) sending said inertial navigation solution from said INS processor to an I/O interface so as to provide navigation data for an on-board avionics system.

15. The real-time integrated vehicle positioning method, as recited in claim 14, after the step (h), further comprising an additional step of injecting said velocity and acceleration of said vehicle from said INS processor into said GPS processor to aid a plurality of global positioning system code tracking loops and a plurality of global positioning system carrier phase tracking loops for requiring and tracking said global positioning system satellite signals, wherein said GPS processor outputs said GPS raw measurements including said pseudorange, said carrier phase, and said Doppler shift.

16. The real-time integrated vehicle positioning method, as recited in claim 14, wherein the step (e) further comprises the steps of:

(e.1) injecting said GPS raw measurements from said GPS processor, GPS reference raw measurements, position, and velocity from said data link, and said inertial navigation solution from said INS processor into a new satellites/cycle slips detection module to test said occurrence of new satellites or cycle slips;

(e.2) initiating an on-the-fly ambiguity resolution module as said new satellites/cycle slips detection module is on when said new satellites or cycle slips occur;

(e.3) fixing integer ambiguities to estimate an accurate vehicle navigation solution, and (e.4) sending said integer ambiguities from said on-the-fly ambiguity resolution module to said Kalman filter.

17. A real-time integrated vehicle positioning method with differential GPS, as recited in claim 15, wherein the step (e) further comprises the steps of:

(e.1) injecting said GPS raw measurements from said GPS processor, GPS reference raw measurements, position, and velocity from said data link, and said inertial navigation solution from said INS processor into a new satellites/cycle slips detection module to test said occurrence of new satellites or cycle slips;

(e.2) initiating an on-the-fly ambiguity resolution module as said new satellites/cycle slips detection module is on when said new satellites or cycle slips occur;

(e.3) fixing integer ambiguities to estimate an accurate vehicle navigation solution, and (e.4) sending said integer ambiguities from said on-the-fly ambiguity resolution module to said Kalman filter.

18. The real-time integrated vehicle positioning method, as recited in claim 16, wherein the step (e.2) further comprises the steps of:

(e.2.1) setting up a search window which comprises a plurality of time (N) epochs;

(e.2.2) searching an integer ambiguity set at a first time epoch of said search window by using an intermediate ambiguity search strategy (IASS), wherein an integer ambiguity set becomes a member of an estimator bank while there is no member in said estimator bank before a first time epoch, wherein based on said integer ambiguity set and phase measurements, a rover position is estimated in said estimator bank, and then a corresponding weight is calculated in a weight bank, as a result, an optimal rover position for said first time epoch is equal to said rover position multiplied by said corresponding weight, and based on an optimal rover position and said Doppler shifts, a rover velocity is estimated;

(e.2.3) searching said integer ambiguity set at a second time epoch of said search window by using said IASS;

(e.2.4) following the step (e.2.3) for other time epochs of said search window, wherein at a last time epoch N of said search window, after said search of said IASS, said estimator bank and said weight bank are completely established;

(e.2.5) inputting continuously said phase measurements into said Kalman filter of said estimator bank at the $(N+1)^{th}$ time epochs, wherein based on said integer ambiguity set and said phase measurements, said rover position is estimated in said estimator bank and said corresponding weight is calculated accumulatively in said weight bank to an associated weight, wherein said optimal rover position is equal to a sum of said rover position multiplied by said associated weight, and further based on said optimal rover position and Doppler shifts, said rover velocity is estimated;

(e.2.6) following the step (e.2.5) after said $(N+1)^{th}$ time epoch until a criterion is met, wherein after said criterion is met, said estimator bank and said weight bank stop functioning, and during a confirmation period, that is from said first time epoch of said search window to said last time epoch when said estimator bank and said weight bank stop functioning, said estimator bank and said weight bank continuously identify a correct integer ambiguity set and estimate said rover position in real-time, wherein a weight corresponding to said correct integer ambiguity is approaching to one while said integer ambiguity set is converging to zero; and (e.2.7) estimating said rover position and velocity by using a least-squares estimated method after said fixing integer ambiguities; as said new satellites or cycle slips occur, thereby the steps (e.2.1) to (e.2.7) are initiated.

19. The real-time integrated vehicle positioning method, as recited in claim 17, wherein the step (e.2) further comprises the steps of:

(e.2.1) setting up a search window which comprises a plurality of time (N) epochs;

(e.2.2) searching an integer ambiguity set at a first time epoch of said search window by using an intermediate ambiguity search strategy (IASS), wherein an integer ambiguity set becomes a member of an estimator bank while there is no member in said estimator bank before a first time epoch, wherein based on said integer ambiguity set and phase measurements, a rover position is estimated in said estimator bank, and then a corresponding weight is calculated in a weight bank, as a result, an optimal rover position for said first time epoch is equal to said rover position multiplied by said corresponding weight, and based on an optimal rover position and said Doppler shifts, a said rover velocity is estimated;

(e.2.3) searching said integer ambiguity set at a second time epoch of said search window by using said IASS;

(e.2.4) following the step (e.2.3) for other time epochs of said search window, wherein at a last time epoch N of said search window, after said search of said IASS, said estimator bank and said weight bank are completely established;

(e.2.5) inputting continuously said phase measurements into said Kalman filter of said estimator bank at the $(N+1)^{th}$ time epochs, wherein based on said integer ambiguity set and said phase measurements, said rover position is estimated in said estimator bank and said corresponding weight is calculated accumulatively in said weight bank to an associated weight, wherein said optimal rover position is equal to a sum of said rover position multiplied by said associated weight, and further based on said optimal rover position and Doppler shifts, said rover velocity is estimated;

(e.2.6) following the step (e.2.5) after said $(N+1)^{th}$ time epoch until a criterion is met, wherein after said criterion is met, said estimator bank and said weight bank stop functioning, and during a confirmation period, that is from said first time epoch of said search window to said last time epoch when said estimator bank and said weight bank stop functioning, said estimator bank and said weight bank continuously identify a correct integer ambiguity set and estimate said rover position in real-time, wherein a weight corresponding to said correct integer ambiguity is approaching to one while said integer ambiguity set is converging to zero; and (e.2.7) estimating said rover position and velocity by using a least-squares estimated method after said fixing integer ambiguities; as said new satellites or cycle slips occur, thereby the steps (e.2.1) to (e.2.7) are initiated.

20. The real-time integrated vehicle positioning method, as recited in claim 18, in the step (e.2.3), wherein when said integer ambiguity set is same as one of said time epochs, a number of said Kalman filter remains, wherein based on said integer ambiguity set and said phase measurements, said rover position is estimated in said estimator bank and said corresponding weight is accumulatively calculated in said weight bank, as a result, said optimal rover position is equal to said rover position multiplied by said associated weight and based on said optimal rover position and said Doppler shifts, said rover velocity is estimated.

21. The real-time integrated vehicle positioning method, as recited in claim 18, in the step (e.2.3), wherein when said integer ambiguity set is different from one of said time epoch, a current integer ambiguity set becomes a new member of said estimator bank, that is a number of said Kalman filter increases by one, wherein based on said integer ambiguity set and said phase measurements, said rover position is estimated in said estimator bank and a calculation of each corresponding weight is recalculated from scratch in said weight bank, and therefore said optimal rover position is equal to a sum of said rover position multiplied by said associated weight, wherein based on said optimal rover position and said Doppler shifts, said rover velocity is estimated.

22. The real-time integrated vehicle positioning method, as recited in claim 19, in the step (e.2.3), in the step (e.2.3), wherein when said integer ambiguity set is same as one of said time epochs, a number of said Kalman filter remains, wherein based on said integer ambiguity set and said phase measurements, said rover position is estimated in said estimator bank and said corresponding weight is accumulatively calculated in said weight bank, as a result, said optimal rover position is equal to said rover position multiplied by said associated weight and based on said optimal rover position and said Doppler shifts, said rover velocity is estimated.

23. The real-time integrated vehicle positioning method, as recited in claim 19, in the step (e.2.3), in the step (e.2.3), wherein when said integer ambiguity set is different from one of said time epoch, a current integer ambiguity set becomes a new member of said estimator bank, that is a number of said Kalman filter increases by one, wherein based on said integer ambiguity set and said phase measurements, said rover position is estimated in said estimator bank and a calculation of each corresponding weight is recalculated from scratch in said weight bank, and therefore said optimal rover position is equal to a sum of said rover position multiplied by said associated weight, wherein based on said optimal rover position and said Doppler shifts, said rover velocity is estimated.

24. The real-time integrated vehicle positioning method and system with differential GPS, as recited in claim 18, wherein said IASS comprises the steps of:
  resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;
  establishing an ambiguity search domain based on estimated primary double difference wide lane ambiguities and a corresponding cofactor matrix;
  searching for an ambiguity set by using a "simplified" least-squares search estimator;
  computing said rover position based on said primary double difference wide lane ambiguities in a position calculation module;
  fixing secondary double difference wide lane ambiguities by applying a primary wide-lane-ambiguity-fixed rover position solution into secondary double difference wide lane phase measurements;
  calculating approximated double difference narrow lane ambiguities and then using an extrawidelaning technique module to resolve double difference narrow lane ambiguities; and
  calculating L1 and L2 ambiguities in a L1 and L2 ambiguity resolution module from a combination of said primary and secondary double difference wide lane ambiguities and said double difference narrow lane ambiguities.

25. The real-time integrated vehicle positioning method and system with differential GPS, as recited in claim 19, wherein said IASS comprises the steps of:
  resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;
  establishing an ambiguity search domain based on estimated primary double difference wide lane ambiguities and a corresponding cofactor matrix;
  searching for an ambiguity set by using a "simplified" least-squares search estimator;
  computing said rover position based on said primary double difference wide lane ambiguities in a position calculation module;
  fixing secondary double difference wide lane ambiguities by applying a primary wide-lane-ambiguity-fixed rover position solution into secondary double difference wide lane phase measurements;
  calculating approximated double difference narrow lane ambiguities and then using an extrawidelaning technique module to resolve double difference narrow lane ambiguities; and
  calculating L1 and L2 ambiguities in a L1 and L2 ambiguity resolution module from a combination of said primary and secondary double difference wide lane ambiguities and said double difference narrow lane ambiguities.

26. The real-time integrated vehicle positioning method and system with differential GPS, as recited in claim 20, wherein said IASS comprises the steps of:
  resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;
  establishing an ambiguity search domain based on estimated primary double difference wide lane ambiguities and a corresponding cofactor matrix;
  searching for an ambiguity set by using a "simplified" least-squares search estimator;
  computing said rover position based on said primary double difference wide lane ambiguities in a position calculation module;
  fixing secondary double difference wide lane ambiguities by applying a primary wide-lane-ambiguity-fixed rover position solution into secondary double difference wide lane phase measurements;
  calculating approximated double difference narrow lane ambiguities and then using an extrawidelaning technique module to resolve double difference narrow lane ambiguities; and
  calculating L1 and L2 ambiguities in a L1 and L2 ambiguity resolution module from a combination of said primary and secondary double difference wide lane ambiguities and said double difference narrow lane ambiguities.

27. The real-time integrated vehicle positioning method and system with differential GPS, as recited in claim 21, wherein said IASS comprises the steps of:

resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;

establishing an ambiguity search domain based on estimated primary double difference wide lane ambiguities and a corresponding cofactor matrix;

searching for an ambiguity set by using a "simplified" least-squares search estimator;

computing said rover position based on said primary double difference wide lane ambiguities in a position calculation module;

fixing secondary double difference wide lane ambiguities by applying a primary wide-lane-ambiguity-fixed rover position solution into secondary double difference wide lane phase measurements;

calculating approximated double difference narrow lane ambiguities and then using an extrawidelaning technique module to resolve double difference narrow lane ambiguities; and calculating L1 and L2 ambiguities in a L1 and L2 ambiguity resolution module from a combination of said primary and secondary double difference wide lane ambiguities and said double difference narrow lane ambiguities.

28. The real-time integrated vehicle positioning method and system with differential GPS, as recited in claim 22, wherein said IASS comprises the steps of:

resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;

establishing an ambiguity search domain based on estimated primary double difference wide lane ambiguities and a corresponding cofactor matrix;

searching for an ambiguity set by using a "simplified" least-squares search estimator;

computing said rover position based on said primary double difference wide lane ambiguities in a position calculation module;

fixing secondary double difference wide lane ambiguities by applying a primary wide-lane-ambiguity-fixed rover position solution into secondary double difference wide lane phase measurements;

calculating approximated double difference narrow lane ambiguities and then using an extrawidelaning technique module to resolve double difference narrow lane ambiguities; and calculating L1 and L2 ambiguities in a L1 and L2 ambiguity resolution module from a combination of said primary and secondary double difference wide lane ambiguities and said double difference narrow lane ambiguities.

29. The real-time integrated vehicle positioning method and system with differential GPS, as recited in claim 23, wherein said IASS comprises the steps of:

resolving primary double difference wide lane ambiguities in a primary double difference wide lane ambiguity resolution module, wherein a priori information of said rover position obtained from ionosphere-free pseudorange measurements and an approximated double difference wide lane ambiguities are combined with a primary double difference wide lane phase measurements to estimate said rover position and said primary double difference wide lane ambiguities;

establishing an ambiguity search domain based on estimated primary double difference wide lane ambiguities and a corresponding cofactor matrix;

searching for an ambiguity set by using a "simplified" least-squares search estimator;

computing said rover position based on said primary double difference wide lane ambiguities in a position calculation module;

fixing secondary double difference wide lane ambiguities by applying a primary wide-lane-ambiguity-fixed rover position solution into secondary double difference wide lane phase measurements;

calculating approximated double difference narrow lane ambiguities and then using an extrawidelaning technique module to resolve double difference narrow lane ambiguities; and calculating L1 and L2 ambiguities in a L1 and L2 ambiguity resolution module from a combination of said primary and secondary double difference wide lane ambiguities and said double difference narrow lane ambiguities.

30. The real-time integrated vehicle positioning method, as recited in claim 24, wherein said a priori information about said rover position is given by said outputs of said INS processor.

31. The real-time integrated vehicle positioning method, as recited in claim 25, wherein said a priori information about said rover position is given by said outputs of said INS processor.

32. The real-time integrated vehicle positioning method, as recited in claim 26, wherein said a priori information about said rover position is given by said outputs of said INS processor.

33. The real-time integrated vehicle positioning method, as recited in claim 27, wherein said a priori information about said rover position is given by said outputs of said INS processor.

34. The real-time integrated vehicle positioning method, as recited in claim 28, wherein said a priori information about said rover position is given by said outputs of said INS processor.

35. The real-time integrated vehicle positioning method, as recited in claim 29, wherein said a priori information about said rover position is given by said outputs of said INS processor.

36. The real-time integrated vehicle positioning method, as recited in claim 16, wherein when no new satellites and cycle slips occur, in the step (e), that is said new satellites/cycle slips detection module is off, the steps (e.2) to (e.4) are bypassed, that is an on-the-fly ambiguity resolution module is off, too, and said integer ambiguities are already resolved in said Kalman filter.

37. The real-time integrated vehicle positioning method, as recited in claim 17, wherein when no new satellites and cycle slips occur, in the step (e), that is said new satellites/cycle slips detection module is off, the steps (e.2) to (e.4) are bypassed, that is an on-the-fly ambiguity resolution module is off, too, and said integer ambiguities are already resolved in said Kalman filter.

* * * * *